US008437739B2

(12) United States Patent
Patwardhan et al.

(10) Patent No.: US 8,437,739 B2
(45) Date of Patent: May 7, 2013

(54) METHOD AND APPARATUS FOR GENERATING A CRYPTOSYNC

(75) Inventors: Ravindra Patwardhan, San Diego, CA (US); Fatih Ulupinar, San Diego, CA (US); Parag Arun Agashe, San Diego, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 854 days.

(21) Appl. No.: 12/193,571

(22) Filed: Aug. 18, 2008

(65) Prior Publication Data
US 2009/0075628 A1 Mar. 19, 2009

Related U.S. Application Data

(60) Provisional application No. 60/956,861, filed on Aug. 20, 2007.

(51) Int. Cl.
*H04M 1/66* (2006.01)
(52) U.S. Cl.
USPC .......... 455/410; 380/30; 380/37; 380/43; 380/255; 380/262; 380/278; 380/280; 370/464; 370/465; 370/468; 713/15; 726/2; 726/3; 726/4; 726/5
(58) Field of Classification Search .......... 380/30, 380/37, 255, 262, 278, 280, 43; 455/410; 370/468, 464, 465; 713/15; 726/2–5
See application file for complete search history.

(56) References Cited

U.S. PATENT DOCUMENTS

| 6,028,933 | A * | 2/2000 | Heer et al. ............ 713/169 |
| 6,259,699 | B1 * | 7/2001 | Opalka et al. .......... 370/398 |
| 7,116,683 | B1 * | 10/2006 | Petersen et al. ........ 370/474 |
| 7,583,664 | B2 * | 9/2009 | Ho et al. ................ 370/386 |
| 7,616,746 | B2 * | 11/2009 | O'Neill ................ 379/114.01 |
| 2003/0065953 | A1 | 4/2003 | Lehmann et al. |
| 2003/0206538 | A1 * | 11/2003 | Rezaiifar et al. ........ 370/335 |
| 2005/0169266 | A1 * | 8/2005 | Aggarwal et al. ....... 370/389 |
| 2007/0041382 | A1 * | 2/2007 | Vayanos et al. ........ 370/394 |
| 2008/0044012 | A1 * | 2/2008 | Ekberg et al. ............ 380/30 |
| 2008/0165953 | A1 * | 7/2008 | Patel ....................... 380/28 |

FOREIGN PATENT DOCUMENTS

| AU | 2005201982 | 2/2008 |
| CN | 1799216 | 7/2006 |
| JP | 8331076 A | 12/1996 |
| JP | 2004032393 A | 1/2004 |

(Continued)

OTHER PUBLICATIONS

Anonymous: "Enhanced Subscriber Privacy for cdma2000 High Rate Packet Data; TIA-925" Sep. 30, 2002, XP017002933, pp. 1-1-pp. 1-3; pp. 2-4-pp. 2-5; pp. 2-8-pp. 2-14.

(Continued)

*Primary Examiner* — Carl Colin
*Assistant Examiner* — Mohammad A Siddiqi
(74) *Attorney, Agent, or Firm* — Darren M. Simon

(57) ABSTRACT

A method and apparatus for generating a cryptosync is disclosed that generates a cryptosync with the desired variability without the overhead in complexity and size of prior cryptosyncs. The cryptosync is generated from a combination of fields including fields relating to the segmentation and reassembly of the data packets at a transmitting terminal and a receiving terminal. The resultant cryptosync does not repeat during the use of a particular security key.

17 Claims, 4 Drawing Sheets

FOREIGN PATENT DOCUMENTS

| | | |
|---|---|---|
| JP | 2005515702 A | 5/2005 |
| JP | 2006246539 A | 9/2006 |
| RU | 2273102 C2 | 3/2006 |
| RU | 2287228 C2 | 11/2006 |
| WO | WO0124436 | 4/2001 |
| WO | WO03061192 | 7/2003 |
| WO | WO03069806 A1 | 8/2003 |
| WO | WO2006096035 | 9/2006 |
| WO | WO2007086934 A2 | 8/2007 |

OTHER PUBLICATIONS

Blom R et al: "The Secure Real Time Transport Protocol" Internet Citation Jul. 31, 2001, XP002222660 Retrieved from the Internet: URL:http://www.globecom.net/ietf/draft/draft-ietf-avt-srtp-01.html> [retrieved on Nov. 27, 2002] p. 5-p. 13.

International Search Report and the Written Opinion—PCT/US2008/073606, International Searching Authority—European Patent Office—Jul. 9, 2009.

Brusilovsky A.,"Cryptosync Structure",TSC-C WG2/SWG21/SWG22/SWG23[online],Dec. 1, 2006,File: C20-20061203-003,[rtrieved on Nov. 7, 2012]. Retrieved from the Interne,URL,<ftp://ftp.3gpp2.org/TSGC/Working/2006/2006-12-Maui/TSG-C-2006-12-Maui/WG2/SWG23/C23-20061204-006%20cryptosync%20structure%20v.1.2.pdf>.

Taiwan Search Report—TW097131752—TIPO—Jul. 5, 2012.

Taiwan Search Report—TW097131752—TIPO—Oct. 19, 2012.

\* cited by examiner

METHOD AND APPARATUS FOR GENERATING A CRYPTOSYNC

CLAIM OF PRIORITY UNDER 35 U.S.C. §119

The present Application for Patent claims priority to Provisional Application No. 60/956,861, entitled "Cryptosync Design," filed Aug. 20, 2007, and assigned to the assignee hereof and hereby expressly incorporated by reference herein.

BACKGROUND

1. Field

The invention relates generally to the field of telecommunications, and more particularly to mechanisms for securing data transmission in a wireless network with a cryptosync.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, Ultra Mobile Broadband (UMB) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

For some wireless applications, security is not necessary and data may be transmitted without encryption between an access terminal and an access network. However, for certain other applications, it may be necessary for "sensitive" data to be transmitted over the air. Examples of such sensitive data may include personal information, credit card information, account information, and so on. For sensitive data, encryption may be used to provide security for the over-the-air transmission.

Many encryption algorithms are available to encrypt data. For many of these encryption algorithms, a security key is used in conjunction with a "cryptosync" to generate a mask that is then used to encrypt the data. The security key is an important aspect of the encryption process, and various techniques have been devised to exchange and maintain the key in secrecy. However, the security key is typically a static value, and the cryptosync is necessary to modify the security key so that a combined mask of the security key and the cryptosync has a different value each time the key is used. For example, if encryption is to be performed on each packet of data, then the cryptosync may be used to generate a new mask for each data packet based on the same security key. The use of a cryptosync may thwart "replay" attacks or "man-in-the-middle" attacks which attempt to trick the receiver into unauthorized operations such as false identification or authentication based on duplicate transactions.

An important property of the cryptosync is its variability (per encryption attempt), which is characterized by a new cryptosync value being provided each time the security key is used. One technique for generating cryptosync is with a timer that keeps track of time based on some absolute time reference. For this technique, the cryptosync may be set equal to the current time, as provided by the timer, when the cryptosync is needed. To ensure proper generation of the cryptosync, however, the timer needs to have the required resolution, which is determined by the rate at which the security key is used (e.g., the rate of the data packet), so that duplicate time values are not used for the cryptosync. The design of various entities (e.g., the base station controller, the mobile terminal) in the communication system may be impacted by the need to maintain a fine time resolution for the packets.

Another technique for generating cryptosync is with a counter that is incremented each time the security key is used (e.g., for each packet to be encrypted). To ensure that the same cryptosync values are used at both the sender and receiver for a given packet, the counters at these two entities need to be synchronized. Moreover, certain restrictions may be imposed on when the counters may be reset to ensure that duplicate counter values are not used. These requirements may complicate the generation of cryptosync based solely on a counter.

There is therefore a need in the art for a cryptosync design that is variable but avoids the overhead in complexity and size described for prior art cryptosync designs.

SUMMARY

A method and apparatus for generating a cryptosync is disclosed that generates a cryptosync with the desired variability without the overhead in complexity and size of prior cryptosyncs.

In one aspect, there is disclosed an apparatus for storing a cryptosync for processing of a data packet, the apparatus operable in a wireless communication system, the cryptosync comprising: a first field associated with the segmenting of the data packet; a second field associated with a stream related to the transmission of the data packet; and a third field associated with a count of a route related to the transmission of the data packet.

In another aspect, there is disclosed an apparatus for retrieving a cryptosync for processing of a data packet, the apparatus operable in a wireless communication system, the cryptosync comprising: a first field associated with the reassembling of the data packet; a second field associated with a stream related to the transmission of the data packet; and a third field associated with a count of a route related to the reception of the data packet.

In another aspect, there is disclosed a method for encrypting a data packet with a cryptosync, the method comprising: obtaining a first field associated with the segmenting of the data packet; obtaining a second field associated with a stream related to the transmission of the data packet; obtaining a third field associated with a count of a route related to the transmission of the data packet; generating the cryptosync for the data packet from the obtained fields; and encrypting the data packet with the cryptosync.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
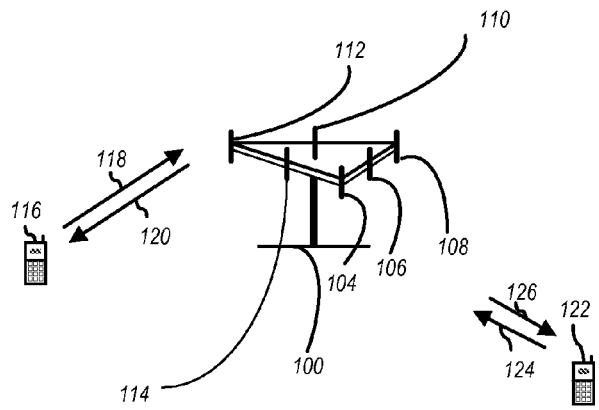
FIG. 1 illustrates a multiple access wireless communication system according to one aspect.

Referring to FIG. 1, a multiple access wireless communication system according to one aspect is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the aspect, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
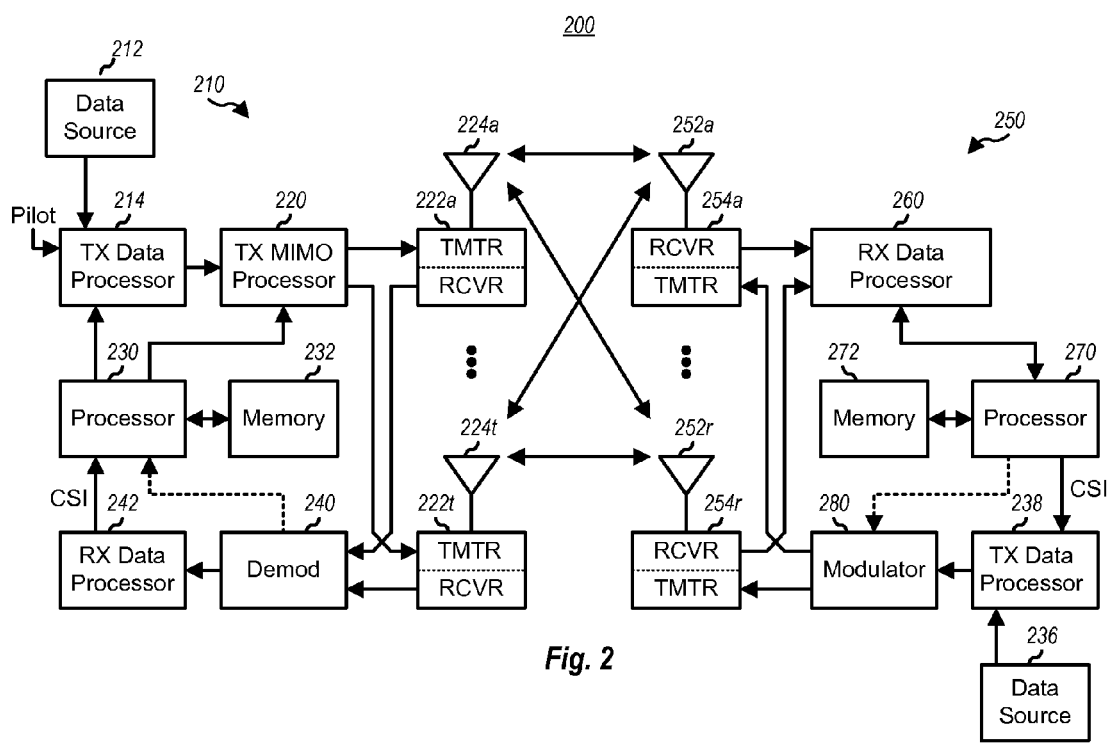
FIG. 2 is a block diagram of a communication system.

FIG. 2 is a block diagram of an aspect of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprises a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCHMBMS point-to-multipoint Control CHannel
MRW Move Receiving Window
MSB Most Significant Bit MSCH MBMS point-to-multipoint Scheduling CHannel
MTCHMBMS point-to-multipoint Traffic CHannel
PCCH Paging Control CHannel
PCH Paging CHannel
PDU Protocol Data Unit
PHY PHYsical layer
PhyCHPhysical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel The cryptosync design described herein may be used for various wireless communication systems. For example, this cryptosync design may be used for CDMA, TDMA, and other systems. The CDMA system may also implement one or more CDMA standards, such as IS-856, IS-2000, IS-95, W-CDMA, UMB, and so on. These various CDMA standards are known in the art and incorporated herein by reference. For clarity, various aspects are specifically described for a CDMA system that implements a UMB system. The UMB system is described in document 3GPP2 C.S0084, entitled "Overview for Ultra Mobile Broadband (UMB) Air Interface Specification," which is incorporated herein by reference.

Figure 3:
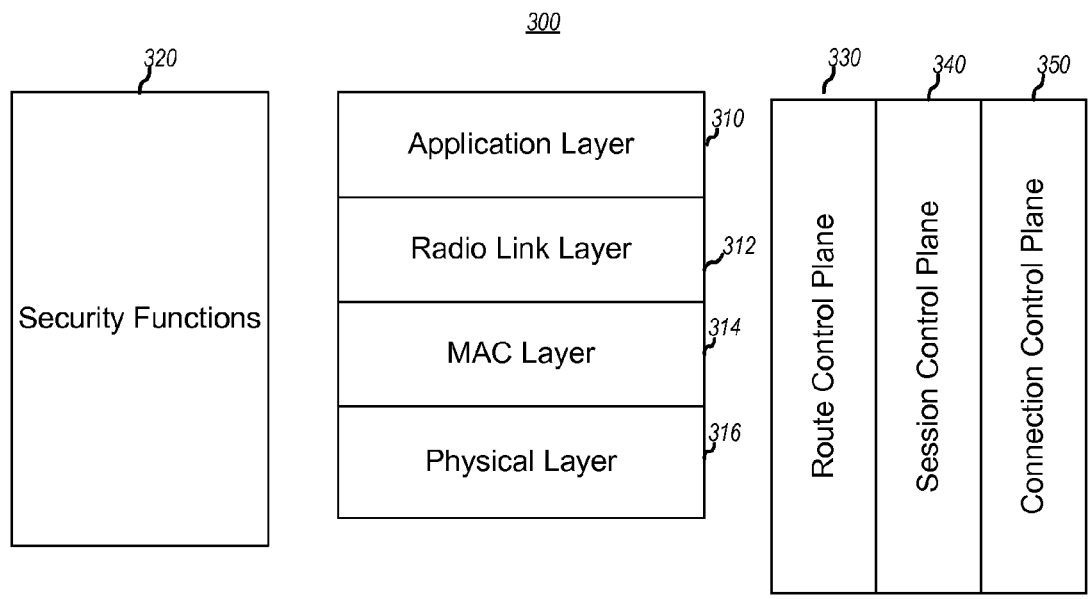
FIG. 3 is a block diagram of an air interface layering architecture.

FIG. 3 is a diagram of the air interface layering architecture 300 defined by UMB. Layering architecture 300 is used to support communication between a terminal and a radio network in the UMB system. As shown in FIG. 3, each layer or plane includes of one or more protocols that performs the function of the layer. Security Functions 320 include functions for key exchange, ciphering, and message integrity protection. Application Layer 310 provides multiple applications, provides the signaling protocol for transporting air interface protocol messages, and a packet application for transporting user traffic data, and so on. Radio Link Layer 312 provides services such as reliable and in-sequence delivery of Application Layer packets, multiplexing of Application Layer packets, and Quality of Service negotiation in support of applications. Medium Access Control (MAC) Layer 314 defines procedures used to receive and transmit over the Physical Layer. Physical Layer 316 defines the "physical" characteristics of the transmission between the terminal and a radio network. These physical characteristics may include, for example, the channel structure, the transmission frequency, the output transmit power level, the modulation format, the encoding scheme, and so on, for the forward and reverse links.

The air interface layering architecture 300 further defines various control planes, such as a Route Control Plane 330, a Session Control Plane 340 and a Connection Control Plane 350. Route Control Plane 330 provides creation, maintenance, and deletion of routes. Session Control Plane 340 provides protocol negotiation and protocol configuration services. Connection Control Plane 350 provides air link connection establishment and maintenance services.

Cryptosyncs are externally-provided synchronizing information for crypto algorithms (ciphers) that allows an encryptor at one end to uniquely encrypt each block of content into ciphertext, and yet allows a decryptor at the other end to properly decrypt the ciphertext to yield the original plaintext. Cryptosyncs are also known as Initialization Vectors (IV). The purpose of the cryptosync is to ensure that identical plaintext blocks do not encrypt to the same ciphertext. For example, it is highly desirable to hide the fact that message_a and message_b start the same way. Without cryptosyncs, the beginning of the ciphertext for both messages will be the same, unless the encryption algorithm maintains some state based on the previous ciphertext bits. Self-synchronizing stream ciphers are an example of such state-based encryption mechanisms.

In wireless communication systems some packets will be lost over-the-air (i.e., received in error or "erased"). If a certain packet is erased, then the encryption of the subsequent packets will fail if the decryption is "state-full" and relies on the ciphertext from the previous packets. Hence, it is desirable to provide the cryptosync that is used for encryption of a packet explicitly to the receiver in order to make it possible for the receiver to decipher the packet independently.

Figure 4:
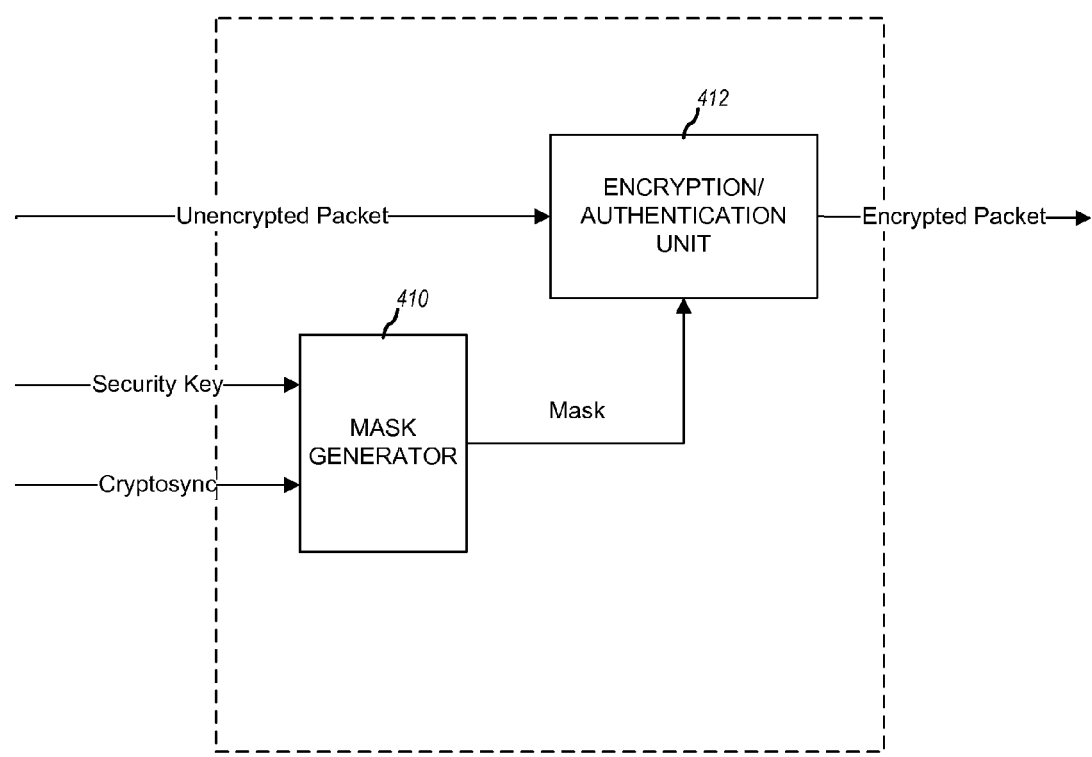
FIG. 4 is a block diagram of a security processor.

FIG. 4 is a block diagram of an aspect of a security processor 400. At the sender, a security key and a cryptosync are provided to a mask generator 410, which generates a mask based on these two inputs. The mask is then provided to an encryption/authentication unit 412, which also receives the data to be encrypted and/or authenticated. For UMB, the encryption and authentication are performed on each RLP packet. The encryption/authentication unit 412 encrypts the packet based on the mask and a particular encryption algorithm. Alternatively the encryption/authentication unit 412 may generate a signature based on the content of the packet, the mask, and a particular authentication algorithm. The signature may be appended to the packet and used at the receiver to authenticate the source of the packet. The specific design of mask generator 410 and encryption/authentication unit 412 is dependent on the particular encryption and/or authentication algorithm being implemented. A security processor at the receiver (not shown) performs the complementary authentication and/or decryption of the received packet.

In an aspect, a cryptosync is derived at both the sender and receiver for each packet to be encrypted and/or authenticated. The cryptosync is used at the sender to perform encryption and/or authentication of the packet. The same cryptosync is also used at the receiver for the complementary decryption and/or authentication of the packet.

Referring back to FIG. 3, in a wireless network, typically a radio link protocol (RLP) (not shown) is defined above the MAC Layer 320 to account for variations in over the air transmission that cannot be handled by the transmission control protocol (TCP). The RLP is used in conjunction with the TCP to address the TCP's poor performance in wireless transmission situations. TCP performs well in traditional networks based on wire line links because of the TCP's efficient congestion control schemes, and because of the low packet loss probability (approximately <0.001) associated with traditional networks. However, the TCP performs poorly over the wireless link because of the high bit error rates associated with wireless links.

Figure 5:
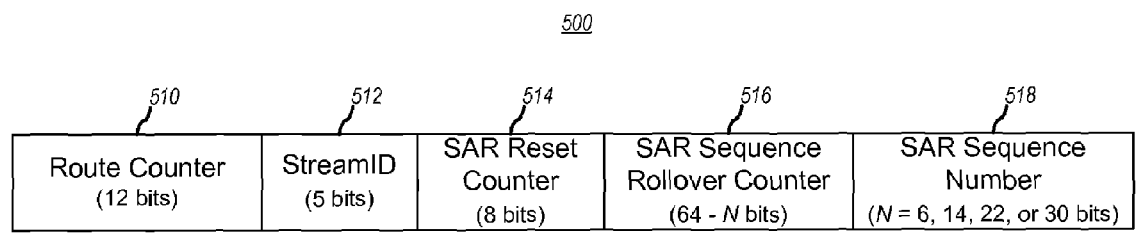
FIG. 5 is a block diagram of an exemplary cryptosync according to one aspect.

One method for dealing with packet losses in over the air transmission environments is dividing data traffic payloads into packetized data traffic. In this data transmission scheme, the receiving terminals detect and reassemble the subpackets to restore the original data packets since a large packet may span several subpackets. When a transmitting terminal transmits a subpacket of an encoded packet to a particular receiving terminal, the transmitting terminal needs to wait a certain time for any acknowledgment or feedback from the receiving terminal. There is then a time to transmit the subpacket on the forward link and to transmit the acknowledgment or feedback on the reverse link. Therefore, a Segmentation and Reassembly sub-protocol (SAR) which operates under the RLP provides at least the following fields for each packet:

SAR Sequence Number
SAR Sequence Rollover Counter
SAR Reset Counter
StreamID
Route Counter Referring now to FIG. 5, a block diagram of an exemplary cryptosync 500 according to one aspect is shown. In one aspect the cryptosync 500 includes the fields of Route Counter 510, the StreamID 512, SAR Reset Counter 514, the SAR Sequence Rollover Counter 516, and the SAR Sequence Number 518. The cryptosync is generated from a concatenation of the fields as shown. In practice, at the transmitting terminal, the cryptosync may be obtained from the header of the packet generated by the Connection Layer in preparing the subpacket. At the receiving terminal, the cryptosync is extracted from the header of the received subpacket.

It can be demonstrated that a cryptosync which includes at least the above fields operates such that the cryptosync is not repeated. For instance, when the SAR Sequence Number rolls over, SAR Sequence Rollover Counter is incremented so that the same cryptosync is not repeated during a SAR sequence. Additionally when the SAR Resets, the SAR Sequence Number and SAR Sequence Rollover Counter is set to zero, but the SAR Reset Counter is incremented. A StreamID ensures that the cryptosync is not repeated across Streams. The Route Counter is incremented each time a new route is created. The inclusion of the Route Counter ensures that the cryptosync is not repeated when a new Route is created but old security keys are used.

As noted above, an important property of the cryptosync is its variability (per encryption attempt), which is characterized by a new cryptosync value being provided each time the security key is used. For TIA-1121 (UMB) (as shown in FIG. 3), encryption and/or authentication may be performed on each RLP packet. In this case, a new cryptosync value needs to be generated for each RLP packet to ensure integrity of the security key.

A number of advantages are afforded by producing a cryptosync based on the SAR sub-protocol. First, overhead is reduced since SAR Sequence numbers are required for functioning of RLP protocol. Since the cryptosync is based on the sequence number, no additional overhead is needed for exchanging a separate cryptosync between the transmitting and receiving terminal.

Second, since SAR sequence numbers are used for packet transmission, no additional circuitry or complexity is required in generating a cryptosync. Furthermore, complex high resolution cryptosyncs need not be exchanged or synchronized between the transmitting and receiving terminals.

In initialization, during session establishment or system configuration, the values for various parameters (such as those related to the cryptosync) may be negotiated between the access network and access terminal. As part of the negotiation, the sender may propose one or more possible sets of values to be used for a particular set of parameters. Each set of parameter values may be provided in a respective record of a message for the complex attribute. The message for the configuration of a complex attribute may thus include one or more records for one or more sets of parameter values.

A replay attack or a man-in-the-middle attack is thwarted in the disclosed scheme. First, the Radio Link Protocol (RLP) at the receiver drops duplicate RLP packets, so the replayed RLP packet does not do any harm. Second, packets sent on the forward link may wait some time in the scheduling buffer before transmission, and Security Layer packets may be transmitted out-of-order. For example, a Security Layer packet that contains signaling has higher priority and may be transmitted earlier than Security Layer packets that were constructed before it. Therefore, the receiving terminal cannot implement a "windowed" anti-replay scheme. Such a window would limit the amount of time that a packet is allowed to wait in the scheduling buffer.

Variations and modifications to this specific cryptosync design may be made, and this is within the scope of the invention. For example, the concatenation of the cryptosync bit fields may be placed in any order. Additionally, some cryptosync bit fields may be omitted depending on the system configuration. Without departing from the scope of the invention, alternative and/or different fields may also be included in the cryptosync.

Also for clarity, various aspects of the cryptosync design have been specifically described for a TIA-1121 (UMB) system. However, the cryptosync design described herein may also be used for other CDMA systems, such as cdma2000 and W-CDMA systems, and for other wireless communication systems.

Techniques for generating and using the cryptosync described herein may be implemented by various means. For example, these techniques may be implemented in hardware, software, or a combination thereof For a hardware implementation, the cryptosync generation and use may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof For a software implementation, the cryptosync generation and use may be implemented with modules (e.g., procedures, functions, and so on) that perform the functions described herein. The software codes may be stored in a memory unit and executed by a processor. The memory unit may be implemented within the processor or external to the processor, in which case it can be communicatively coupled to the processor via various means as is known in the art.

The cryptosync and data packets described herein may be derived/constructed and stored in various types of electronics unit. For example, the cryptosync and data packets may be stored in a random access memory (RAM), a dynamic RAM (DRAM), a Flash, and so on. The cryptosync and data packets may also be stored in temporary memory, registers, latches, and so on, within the ASIC, processor, DSP, and so on, that may be used to perform secured processing on the data packets with the cryptosync.

Headings are included herein for reference and to aid in locating certain sections. These headings are not intended to limit the scope of the concepts described therein under, and these concepts may have applicability in other sections throughout the entire specification.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. An apparatus for encrypting a data packet with a cryptosync, the apparatus comprising:
   a memory;
   a processor, comprising hardware, coupled to the memory and configured to:
   obtain a first field associated with segmenting of the data packet;
   obtain a second field associated with a stream related to transmission of the data packet;
   obtain a third field associated with a count of a route related to the transmission of the data packet, wherein the count is incremented each time a new route is created; and
   generate the cryptosync for the data packet from the obtained fields, wherein the cryptosync comprises a fourth field associated with resetting the segmenting of the data packet of the first field, and a fifth field associated with a count of a number of times the segmenting of the data packet of the first field is reset, wherein the count is incremented each time the first field is reset; and
   an encryption unit configured to encrypt the data packet with the cryptosync.

2. The apparatus of claim 1, wherein the cryptosync further comprises:
   a sixth field associated with a count of instances of rolling over the first field.

3. The apparatus of claim 2, wherein any of the first field, second field, third field, or fourth field are variable in length.

4. The apparatus of claim 2, further comprising:
   a mask generator for generating a mask from the cryptosync and a security key, wherein the encryption unit is configured to encrypt the data packet with the mask.

5. The apparatus of claim 1, wherein the fourth field is reset when the first field rolls over.

6. An apparatus for authenticating a data packet with a cryptosync, the apparatus comprising:
   a memory;
   a processor, comprising hardware, coupled to the memory and configured to:
   obtain a first field associated with the reassembling of the data packet;
   obtain a second field associated with a stream related to the reception of the data packet;
   obtain a third field associated with a count of a route related to the reception of the data packet, wherein the count is incremented each time a new route is created; and
   generate the cryptosync for the data packet from the obtained fields, wherein the cryptosync comprises a fourth field associated with resetting the segmenting of the data packet of the first field, and a fifth field associated with a count of a number of times the segmenting of the data packet of the first field is reset, wherein the count is incremented each time the first field is reset; and
an authentication unit configured to authenticate the data packet with the cryptosync.

7. The apparatus of claim 6, wherein the cryptosync further comprises:
a sixth field associated with a count of instances of rolling over the first field.

8. The apparatus of claim 7, further comprising:
a mask generator for generating a mask from the cryptosync and a security key, wherein the authentication unit is configured to authenticate the data packet with the mask.

9. The apparatus of claim 6, wherein the fourth field is reset when the first field rolls over.

10. The apparatus of claim 9, wherein any of the first field, second field, third field, or fourth field are variable in length.

11. In a wireless communication system, a method for encrypting a data packet with a cryptosync, the method comprising:
obtaining a first field associated with the segmenting of the data packet;
obtaining a second field associated with a stream related to the transmission of the data packet;
obtaining a third field associated with a count of a route related to the transmission of the data packet, wherein the count is incremented each time a new route is created;
generating the cryptosync for the data packet from the obtained fields, wherein the cryptosync comprises a fourth field associated with resetting the segmenting of the data packet of the first field, and a fifth field associated with a count of a number of times the segmenting of the data packet of the first field is reset, wherein the count is incremented each time the first field is reset; and
encrypting the data packet with the cryptosync.

12. The method of claim 11, further comprising:
obtaining a sixth field associated with a count of instances of rolling over the first field.

13. The method of claim 12, wherein any of the first field, second field, third field, or fourth field are variable in length.

14. The method of claim 12, wherein the fields are included in the header of the data packet.

15. The method of claim 11, wherein the fourth field is reset when the first field rolls over.

16. An apparatus in a wireless communication system for encrypting a data packet with a cryptosync, comprising:
means for obtaining a first field associated with the segmenting of the data packet;
means for obtaining a second field associated with a stream related to the transmission of the data packet;
means for obtaining a third field associated with a count of a route related to the transmission of the data packet, wherein the count is incremented each time a new route is created;
means for generating the cryptosync for the data packet from the obtained fields, wherein the cryptosync comprises a fourth field associated with resetting the segmenting of the data packet of the first field, and a fifth field associated with a count of a number of times the segmenting of the data packet of the first field is reset, wherein the count is incremented each time the first field is reset; and
means for encrypting the data packet with the cryptosync.

17. A computer program product in a wireless communication system for encrypting a data packet with a cryptosync, comprising:
a non-transitory computer-readable medium comprising:
a first set of codes for causing a computer to obtain a first field associated with the segmenting of the data packet;
a second set of codes for causing the computer to obtain a second field associated with a stream related to the transmission of the data packet;
a third set of codes for causing the computer to obtain a third field associated with a count of a route related to the transmission of the data packet, wherein the count is incremented each time a new route is created;
a fourth set of codes for causing the computer to generate a cryptosync for the data packet from the obtained fields, wherein the cryptosync comprises a fourth field associated with resetting the segmenting of the data packet of the first field, and a fifth field associated with a count of a number of times the segmenting of the data packet of the first field is reset, wherein the count is incremented each time the first field is reset; and
a fifth set of codes for causing the computer to encrypt the data packet with the cryptosync.

\* \* \* \* \*